United States Patent [19]

Erpenbach et al.

[11] Patent Number: 4,557,760
[45] Date of Patent: Dec. 10, 1985

[54] PROCESS FOR RECOVERING NOBLE METALS BELONGING TO GROUP VIII OF THE PERIODIC SYSTEM OF THE ELEMENTS FROM A CONTAMINATED CATALYST SOLUTION ORIGINATING FROM THE CARBONYLATION OF METHYL ACETATE AND/OR DIMETHYLETHER

[75] Inventors: Heinz Erpenbach, Cologne; Klaus Gehrmann; Winfried Lork, both of Erftstadt; Peter Prinz, Hürth, all of Fed. Rep. of Germany

[73] Assignee: Hoechst Aktiengesellschaft, Fed. Rep. of Germany

[21] Appl. No.: 614,480

[22] Filed: May 29, 1984

[30] Foreign Application Priority Data

Jun. 8, 1983 [DE] Fed. Rep. of Germany ....... 3320630

[51] Int. Cl.$^4$ .............................................. C01G 55/00
[52] U.S. Cl. ........................................ 75/121; 423/22; 502/22; 502/24; 502/33; 560/232
[58] Field of Search .......... 252/411, 412, 413, 411 R; 260/549, 546; 548/345; 562/607, 517; 423/22; 75/121; 568/9; 560/232; 502/24, 33, 29, 31, 22, 26; 546/182, 347

[56] References Cited

U.S. PATENT DOCUMENTS 4,131,640 12/1978 von Kutepow et al. ............. 423/22
4,340,569  7/1982 Davidson et al. .................... 423/22
4,340,570  7/1982 Davidson ............................. 502/26
4,341,741  7/1982 Davidson et al. ................... 423/22
4,440,570  4/1984 Erpenbach et al. .................. 502/24
4,476,237 10/1984 Porcelli ................................ 502/29
4,476,238 10/1984 Palmer et al. ........................ 502/29

Primary Examiner—John Doll
Assistant Examiner—Robert L. Stoll
Attorney, Agent, or Firm—Connolly and Hutz

[57] ABSTRACT

In this process for recovering noble metals of group VIII from a contaminated catalyst solution originating from the carbonylation of methyl acetate and/or dimethylether (the catalyst solution containing carbonyl complexes of these noble metals, organic or inorganic promoters, undistillable organic contaminants as well as volatiles) the volatiles are distillatively removed from the catalyst solution and the remaining distillation residue is water-treated, whereby the noble metal/carbonyl-complex is precipitated together with the organic contaminants and is separated from the aqueous phase, while the promotor is dissolved and recovered in conventional manner. The noble metals are then set free in elemental form by subjecting the noble metal/carbonyl-complex separated and contaminated with organic polymers at temperatures of 150° to 300° C. to treatment with an ethyleneglycoldialkylether solvent of the formula $R(-OCH_2-CH_2)_n-OR$, in which n stands for a number of from 1 to 4 and R stands for identical or different alkyl groups having from 1 to 6 carbon atoms. The noble metal can then be recovered by filtration, and the solvent can be freed of organic contaminants by distillation.

6 Claims, No Drawings

PROCESS FOR RECOVERING NOBLE METALS BELONGING TO GROUP VIII OF THE PERIODIC SYSTEM OF THE ELEMENTS FROM A CONTAMINATED CATALYST SOLUTION ORIGINATING FROM THE CARBONYLATION OF METHYL ACETATE AND/OR DIMETHYLETHER

The invention relates to a process for recovering noble metals belonging to group VIII of the Periodic System of the elements from a contaminated catalyst solution originating from the carbonylation of methyl acetate and/or dimethylether, the catalyst solution containing carbonyl complexes of these noble metals, organic compounds of the nitrogen group and/or salts of alkali metals, alkaline earth metals, chromium, iron, cobalt or nickel as promoters, undistillable organic contaminants as well as acetic acid, acetic anhydride and ethylidene diacetate, wherein the volatile constituents are distillatively removed from the catalyst solution and the remaining distillation residue is water-treated, whereby the noble metal/carbonyl-complex is precipitated together with the organic contaminants and is separated from the aqueous phase whilst the promoter is dissolved and recovered in conventional manner.

The noble metal catalysts used in carrying out hydroformylation and carbonylation reactions are selected from a wide variety of rhodium complex compounds. Needless to say, the recovery of rhodium, or purificaton of rhodium complex compounds, from contaminated catalyst systems or distillation redidues which are obtained in these reactions has already been described in literature.

The process for separating rhodium from a solution containing rhodium/carbonyl-complex compounds and converting the separated rhodium to soluble rhodium/-carbonyl-complex compounds described in German Specification DE-OS No. 22 62 852 lacks commercial attractiveness. In this process, the reaction solution containing rhodium/carbonyl-complex compounds is treated with hydrogen in the presence of one or more carriers at temperatures of 25° to 300° C. and under pressures of 1 to 700 bars to effect the deposition of the rhodium on the carrier.

After separation of the reaction solution, the rhodium so deposited is reconverted to a soluble rhodium/carbonyl-complex compound by subjecting it to treatment at elevated temperature and under increased pressure with carbon monoxide in the presence of a solvent and compound capable of replacing the carbon monoxide ligand. An average of only 96% but at most 99.9% rhodium is deposited on the carrier. Irrespective of the high pressure of about 700 bars, not more than at most 84.4% of the rhodium is detached from the carrier and converted to a soluble rhodium/carbonyl-complex compound. As can be inferred from this, the rhodium recovered is at best obtained in a total yield of 84.3% which is commercially unacceptable in view of the high rhodium price. A further serious disadvantage of this process resides in that the carrier also contains 0.8-5% palladium. In asmuch as palladium also forms carbonyl complexes, it is only natural that palladium becomes detached together with the rhodium.

German Specification DE-OS No. 32 08 060 and DE-OS No. 32 08 061 describe processes for recovering noble metals belonging to group VIII of the Periodic System of the elements from the residue obtained in a carbonylation reaction carried out with the use of a noble metal catalyst. After separation of volatile constituents under reduced pressure, the rhodium is set free by subjecting the remaining residue to treatment with an amine, preferably an aliphatic amine or hydrazine, and subsequently recovered by extraction with an aqueous hydrohalic acid and optionally ethylenedimaine tetracetic acid.

Allegedly, the treatment with the amine is even more effective in all those cases in which the residue obtained under reduced pressure is pretreated with an alcohol, especially methanol, then concentrated under vaccum and ultimately treated with the amine. In this case, rhodium is said to be recoverable in a yield of at least 99%. Indeed, however, highly polymeric compounds are liable to concentrate during operation over some prolonged time, and this adverse effect is common to the two processes just described. In addition to this, they both comprise several stages which would not appear to add to commercial attractiveness.

Still further processes for purifying and recovering contaminated catalyst solution originating from the carbonylation of methyl acetate and/or dimethylether have been described in German Specifications DE-OS Nos. 31 34 347 and 31 34 350. These two processes provide for the contaminated catalyst solution to be first freed from volatile constituents. In DE-OS No. 31 34 347, the remaining residue is freed from organic contaminants by extracting it with an aliphatic ether. In DE-OS No. 31 34 350, the residue freed from volatile constituents is first water-treated and thereby separated into a water-soluble organic promoter and into a water-insoluble mixture of rhodium/carbonyl-complex compound and organic contaminants. Next, the water-insoluble residue is subjected to treatment with an aliphatic ether and the organic contaminants are dissolved out. In either case, the noble metal/carbonyl-complex is preserved and recycled to the reaction cycle whilst the respective residue is in each case separated from the ether phase. The rhodium and/or noble metal yield is between 98.8 and 99.6%.

In the event of the purified catalyst being repeatedly recycled into the carbonylation reaction, the two processes last described are liable to give rise to the concentration, in the catalyst solution to undergo purification, of compounds no longer extractible by means of an aliphatic ether.

The present invention avoids the adverse effects referred to hereinabove and discloses a process permitting the catalyst complex used for, and contaminated during, the carbonylation of methyl acetate and/or dimethylether to be worked up by thermal/extractive methods which provide for its undistillable organic contaminants to be extracted with an ethyleneglycoldialkylether of the formula $R(OC_2H_4)_n$—OR (n=1-4), for the noble metal belonging to group VIII to be precipitated and to be recovered in elemental form in a yield higher than 99.8%, based on the noble metal used. This purification method unexpectedly permits the precipitation of the noble metal in elemental form from the ethyleneglycoldialkylether phase, the metal remaining undissolved in the organic solvent, whilst even highly polymeric contaminants are extracted and dissolved.

The process of this invention comprises more particularly: setting free the noble metals in elemental form by subjecting the noble metal/carbonyl-complex separated and contaminated with organic polymers at temperatures of 150° to 300° C. to treatment with an ethyleneglycoldialkylether of the formula R(—OCH$_2$—CH$_2$—)$_n$—OR, in which n stands for a number of from 1 to 4 and R stands for identical or different alkyl groups having from 1 to 6 carbon atoms, and recovering the noble metals so set free by filtration and, after distillative removal and recovery of the solvent, removing the organic contaminants initially retained in the solvent.

Further preferred and optional features of the invention provide:

(a) for the separated and contaminated noble metal/carbonyl-complex to be treated with the ethyleneglycoldialkylether at temperatures of 210° to 250° C.;

(b) for 5 to 30 parts by weight ethyleneglycodialkylether to be used per part by weight contaminated noble metal/carbonyl-complex;

(c) for the contaminated noble metal/carbonyl-complex to be heat-treated with the ethyleneglycoldialkylether with addition of hydrogen or synthesis gas (H$_2$+CO);

(d) for the contaminated noble metal/carbonyl-complex to be heat-treated under a pressure of 1 to 50 bars.

The ethyleneglycoldimethylethers which are preferably used are selected from triethyleneglycoldimethylether, diethyleneglycoldimethylether and diethyleneglycol-n-butyl-t-butylether. It is also possible, however, to use mixtures of various ethyleneglycoldialkylethers.

The contaminated catalyst solution originates more particularly from the reaction mixture issuing from a carbonylation reactor, the reaction mixture being distillatively separated into desirable final products, especially acetic anhydride, acetic acid and/or ethylidene diacetate, and into unreacted cycled feed material on the one hand, and into catalyst solution (which is the base product) on the other hand. A partial stream of catalyst solution which becomes contaminated with the passage of time, is taken from the catalyst solution cycle and distillatively freed, preferably at 70°–130° C. and 0.2–100 millibars, from volatile constituents, such as acetic acid, acetic anhydride and ethylidene diacetate.

The contaminated catalyst solution generally contains rhodium, iridium, palladium and/or ruthenium as noble metals which are present in the form of carbonyl/complex-compounds, e.g. [CH$_3$P(C$_4$H$_9$)$_3$]$_2$Rh(CO)I$_5$ or CH$_3$P(C$_4$H$_9$)$_3$Rh(CO)$_2$I$_2$.

The catalyst solutions also contain as the preferred organic promoter one or more of the following heterocyclic aromatic nitrogen compounds or organophosphorus compounds:

1. N-methylpyridinium iodide, N,N-dimethylimidazolium iodide, N-methyl-3-picolinium iodide, N-methyl-2,4-lutidinium iodide, N-methyl-3,4-lutidinium iodide, N-methyl-quinolinium iodide;

2. tri-n-butyl-methyl-phosphonium iodide, trioctylmethyl-phosphonium iodide, trilauryl-methyl-phosphonium iodide, triphenyl-methyl-phosphonium iodide.

The useful inorganic promoters should conveniently be selected from the acetates and iodides but also from the bromides, chlorides, nitrates or sulfates of alkali metals or alkaline earth metals as well as of chromium, iron, cobalt or nickel.

Next, the remaining distillation residue is introduced, preferably with agitation, into water and preferably heated to 40°–80° C. It is good practice to use 10–100 parts by weight water per part by weight distillation residue. The promoter present in the distillation residue becomes dissolved in the water phase, whilst the noble metal/carbonyl-complex and undistillable organic contaminants formed during the reaction remain undissolved. The residue insoluble in the water phase is filtered off or subjected to heat treatment, if desired with addition of hydrogen or synthesis gas, in an ethyleneglycoldialkylether of the formula R(OC$_2$H$_4$)$_n$—OR (n=1-4) at 230° C., for example. This results in the dissolution of the organic contaminant originating from the water-insoluble residue and in the decomposition of the noble metal/carbonyl-complex compound, and elemental noble metal commences precipitation. The noble metal is filtered off, subjected to suitable treatment, and reused in the carbonylation process.

The undistillable organic contaminants dissolved in the ethyleneglycoldialkylether are, e.g. incinerated, after prior distillative removal of the ether, which can be used again for recovering noble metal therewith.

The process of this invention can be carried out continuously and discontinuously.

EXAMPLE 1

200 g catalyst solution was taken from the catalyst cycle of a dimethylether carbonylation reaction, the catalyst cycle consisting of acetic anhydride, acetic acid, ethylidene diacetate, rhodium/carbonyl-complex (LRh(CO)$_2$I$_2$; L=CH$_3$P(CH$_2$CH$_2$CH$_2$CH$_3$)$_3$), tri-n-butylmethylphosphonium iodide as an organic promoter, and undistillable organic contaminants. This solution was separated under a pressure of at most 0.4 millibars and at a temperature of up to 120° C. in the still into 33.6 g (16.8 mass %) distillate (composed of: 46.1 mass % acetic acid, 52.4 mass % acetic anhydride, 1.5 mass % ethylidene diacetate) and 166.4 g distillation residue containing 1.95 g rhodium and 137.9 g tri-n-butylmethylphosphonium iodide (=5.97 mass % Rh/carbonyl-complex and 68.95 mass % TBMPI), based on 200 g catalyst solution. The distillation residue was pulverized in a mortar and introduced with strong agitation into 4 liters water at 20°–25° C. After 30 minutes, the suspension was heated to 70° C. while agitation was continued. After a total period of 1.5 hours, the remaining residue was suction-filtered, after-washed with water and dried at 120° C. under a pressure of at most 1 millibar. 28.5 g material was weighed. It was analyzed and found to contain 1.95 g rhodium. 137.5 g (99.7 % based on the quantity used) tri-n-butylmethylphosphonium iodide was recovered from the aqueous phase in known manner by evaporating the water at still temperatures of up to 120° C. under a pressure of at most 1 millibar. The water-insoluble residue was subdivided into three equal portions for further work up.

9.5 g water-insoluble residue was admixed with 190 g triethyleneglycoldimethylether and the whole was heated for 5 hours to 220° C. with agitation. Next, the whole was cooled to room temperature and filtered. After drying, 0.656 g of a residue with 98.9 mass % rhodium was obtained in the filter; this corresponded to a Rh-yield of 99.8%, based on the rhodium used.

The 198 g filtrate recovered was separated in a rotary evaporator into 189 g distillate and 8.5 g residue. The distillate consisted of reusable triethyleneglycoldimethylether; the organic polymers containing 0.2 mass % rhodium, based on the Rh used, were in the distillation residue which was disposed of.

The filtration residue consisting of rhodium was subjected to suitable treatment and reused in the carbonylation process.

EXAMPLE 2

9.5 water-insoluble residue obtained as described in Example 1 was admixed with 150 g triethyleneglycoldimethylether and the whole was heated for 3 hours to about 220° C. with agitation and while injecting 3 l/h synthesis gas (50 volume % hydrogen, 50 volume % carbon monoxide). Next, the batch was cooled to 20° C. and filtered. 0.656 g filter cake containing 99 mass % rhodium (=more than 99.9 % Rh-yield, based on the rhodium used) and 158 g filtrate were obtained. The filtrate was separated in a rotary evaporator under a pressure of at most 1 millibar and at a bath temperature of about 120° C. into 149 g triethyleneglycoldimethylether and 8.5 g residue. The rhodium recovered as filter cake was recycled to the carbonylation process, whilst the residue and undistillable organic compounds were removed.

EXAMPLE 3

9.5 g water-insoluble residue obtained as described in Example 1 and 210 g diethyleneglycoldimethylether were placed in a corrosion-resistant stainless steel autoclave and a hydrogen pressure of 10 bars was established. Next, the whole was heated for 5 hours to 230°-240° C.; a pressure of 20-25 bars was found to establish in the autoclave.

After cooling, the pressure was released, the product was taken from the autoclave and dried. After drying, 0.657 g residue was in the filter. Analysis indicated a rhodium content of 98.9%, corresponding to a yield of recovered rhodium of more than 99.9%. The filtrate (218 g) was distilled and gave 8.5 g residue and 209.5 g diethyleneglycoldimethylether.

EXAMPLE 4

200 g catalyst solution was taken from the catalyst cycle of a methyl acetate carbonylation reaction, the catalyst cycle consisting of the rhodium/carbonyl-complex (L$_2$Rh(CO)I$_5$;

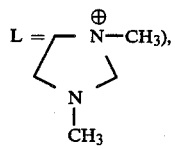

N,N-dimethylimidazolium iodide as an organic promoter, undistillable organic contaminants, acetic acid, acetic anhydride and ethylidene diacetate. This solution was separated under a pressure of at most 2 millibars and at a temperature of up to 120° C. in the still into 42 g (21.0 mass %) distillate (48.3 mass % acetic acid, 51.2 mass % acetic anhydride, 0.5 mass % ethylidene diacetate) and 158.0 g distillation residue containing 1.8 g rhodium (=8.13 mass % rhodium/carbonyl-complex and 65.6 mass % DMII, based on 200 g catalyst solution). The distillation residue was introduced with vigorous agitation into 4.5 l water; next, the suspension was heated to about 70° C. and maintained at that temperature for 1 hour. The remaining residue was filtered, after-washed with water and dried at 120° C./2 millibars. 32.8 g residue containing 5.49% (=1.8 g) rhodium was weighed. The rhodium was set free by admixing the whole residue with 550 g triethyleneglycoldimethylether and maintaining it for 3 hours at a temperature of 220° C. while injecting 4 l/h hydrogen. After cooling and filtration, 1.82 g filter residue containing 98.7 mass % rhodium was obtained. The yield of recovered rhodium was 99.8%. The filtrate (580 g) was distilled and gave 30.5 g residue and 549 g triethyleneglycoldimethylether.

EXAMPLE 5

200 g catalyst solution was taken from the catalyst cycle of a methyl acetate carbonylation reaction and freed from undistillable matter under reduced pressure of at most 2 millibars and at a temperature in the still of up to 120° C., the catalyst cycle consisting of the rhodium/carbonyl-complex (LiRh(CO)$_2$I$_2$), lithium iodide and lithium acetate as inorganic promoters and undistillable organic contaminants. 144.4 g (72.2 mass %) distillate (39.3 mass % acetic acid, 58.6 mass % acetic anhydride, 2.1 mass % ethylidene diacetate) and 55.6 g (27.8 mass %) distillation residue containing 1.72 g rhodium were obtained. The distillation residue was introduced with agitation into 1500 g water and heated for 1 hour to 60°-70° C. The remaining residue was filtered at 120° C./2 millibars and dried; it weighed 21.0 g (rhodium content=8.2 mass %). The rhodium was set free by treating the whole residue with 350 g diethyleneglycol-n-butyl-t-butylether for 4 hours at 230° C. while injecting 5 l/h synthesis gas. After cooling, the whole was filtered and 1.738 g filter residue which contained 99.8 mass % rhodium was obtained. The yield of recovered rhodium was 99.8%. The filtrate (368 g) was distilled and gave 18 g residue and 349.5 g reusable diethyleneglycol-n-butyl-t-butylether.

We claim:

1. In the process for recovering noble metals belonging to group VIII of the Periodic System of the elements from a contaminated catalyst solution originating from the carbonylation of methyl acetate, dimethylether or a mixture thereof, the catalyst solution containing carbonyl complexes of these noble metals, at least one substance selected from the group consisting of organic compounds of the nitrogen group and salts of alkali metals, alkaline earth metals, chromium, iron, cobalt or nickel as promoters, and undistillable organic contaminants as well as acetic acid, acetic anhydride and ethylidene diacetate, wherein the volatile constituents are distillatively removed from the catalyst solution and the remaining distillation residue is water-treated whereby the noble metal/carbonyl-complex is precipitated together with the organic contaminants and is separated from the aqueous phase, whilst the promoter is dissolved and recovered, the improvement which comprises: setting free the noble metals in elemental form by subjecting the noble metal/carbonyl-complex separated and contaminated with organic polymers at temperatures of 150° to 300° C. to treatment with an ethyleneglycoldialkylether of the formula R(—OCH$_2$—CH$_2$)$_n$—OR, in which n stands for a number of from 1 to 4 and R stands for identical or different alkyl groups having from 1 to 6 carbon atoms, and recovering the noble metals so set free by filtration and, after distillative removal and recovery of the solvent, removing the organic contaminants initially retained in the solvent.

2. A process as claimed in claim 1, wherein the separated and contaminated noble metal/carbonyl-complex is treated with the ethyleneglycoldialkylether at temperatures of 210° to 250° C.

3. A process as claimed in claim 1, wherein 5 to 30 parts by weight ethyleneglycoldialkylether are used per part by weight contaminated noble metal/carbonyl-complex.

4. A process as claimed in claim 1, wherein the contaminated noble metal/carbonyl-complex is heat-treated with the ethyleneglycoldialkylether with addition of hydrogen or synthesis gas ($H_2+CO$).

5. A process as claimed in claim 1, wherein the contaminated noble metal/carbonyl-complex is heat-treated under a pressure of 1 to 50 bars.

6. A process for recovering a noble metal belonging to group VIII of the Periodic System of the elements from a contaminated catalyst solution originating from the carbonylation of methyl acetate, dimethylether or a mixture thereof, the contaminated catalyst solution containing a carbonyl complex of the noble metal, at least one organo-phosphorus or organo-nitrogen or inorganic salt promoter, and undistillable organic contaminants as well as acetic acid, acetic anhydride and ethylidene diacetate, wherein volatile constituents of the contaminated catalyst solution are distillatively removed therefrom said process comprising:

water-treating the distillation residue remaining from the distillative removal of the volatiles to obtain an aqueous phase containing the promoter in solution, whereby the carbonyl-complex of the noble metal is precipitated together with the undistillable organic contaminants and is thereby separated in contaminated form from the aqueous phase; recovering the promoter from the aqueous phase; setting free the noble metal in elemental from by subjecting the contaminated, precipitated carbonyl-complex of the noble metal, at temperatures of 150° to 300° C., to treatment with an ethyleneglycoldialkylether solvent of the formula $R(-OCH_2-CH_2-)_n-OR$, in which n stands for a number of from 1 to 4 and R stands for identical or different alkyl groups having from 1 to 6 carbon atoms, and recovering uncontaminated noble metal thus set free by filtration, and, after distillative removal and recovery of this solvent, removing the undistillable organic contaminants which were initially retained in the solvent.

* * * * *